United States Patent Office 3,284,914
Patented Nov. 15, 1966

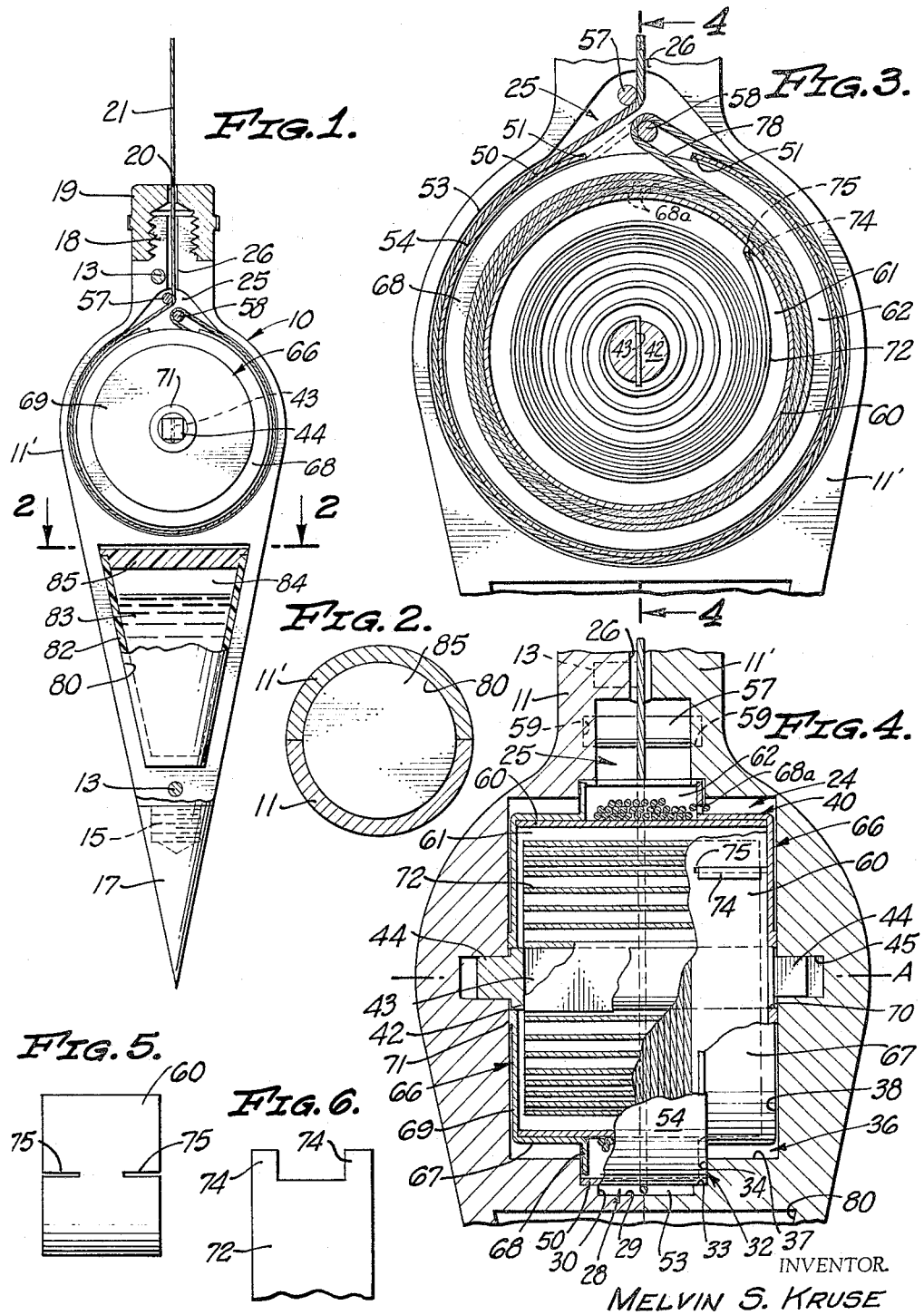

3,284,914
LINE-RETRIEVING PLUMB BOB
Melvin S. Kruse, 9525 Holbrook, Pico Rivera, Calif.
Filed May 18, 1964, Ser. No. 368,017
4 Claims. (Cl. 33—217)

This invention relates to line-retrieving devices. It will be exemplified as applied to a retractable or line-retrieving plumb bob containing an internal reel from which the line can be drawn to various lengths to support and hold the plumb bob at a desired elevation. A retractable plumb bob of this general type is shown and claimed in my Patent 3,064,356, the present invention being an improvement thereon.

Engineers and transit men are often required to suspend a plumb bob short or long distances below a transit or level. Considerable line must be stored on a reel in the limited space provided within the body of the plumb bob if the line is to be extended for long distances, e.g. up to twenty feet or more. At the same time the line should wind and unwind on the reel in a line space of limited axial length. The side boundaries of such a zone should be defined by flanges of the reel and the winding and unwinding of the line should be without danger of catching or clamping. It is an object of the present invention to provide an improved reel structure for this type of device and an improved means for anchoring the spring thereto.

Frictional forces holding the plumb bob at a selected level are desirably induced largely by looping the line around shoulders and causing it to surround an internal friction member or band, all in such manner that the spring and the weight of the bob tension the line and hold it against the friction member and such shoulders. In my prior patent, the tangentially-extending ends of the friction member were anchored by being bent to encircle closely spaced pins, one of the encircling portions forming one friction shoulder and the other providing a guide passage for transferring the line to the outer surface of the friction member. This arrangement is unduly costly and has given some trouble in service through undue wear on the line and sometimes a slight shift in position of the band, leading to erratic operation. Further, it is difficult to bend the ends of the spring accurately and attach them to the pins so that they provide smooth friction surfaces yet closely surround the pins with no chance of becoming loosened therefrom during operation. It is an object of the invention to provide an improved structure for mounting such a friction member or band. In this connection it is an object to dispose a friction band with its edges in circular channels of the housing, preferably with the ends of the band respectively spaced from one or both of the pins providing the friction surfaces around which the line moves during retraction or play-out.

As distinct from peripherally journaling the reel, it is an object of the present invention to journal the reel on a small central member traversing the reel space. The resulting journaling friction is lower and more uniform under all operating conditions.

Another object of the invention is to provide a reel having an inner spring space longer in axial direction than an outer line space. It is then possible to employ a relatively wide spiral spring in the spring space. Additionally the smaller line space provides for a better winding and unwinding of the line as the latter moves into and from a line-receiving opening.

It is a further object to provide a reel made of a sleeve member and two cap members at the ends thereof; also to attach the outer end of the spring to such a reel by use of one or more tabs extending through the sleeve member. A further object is to deform such a tab so that its end portion is clamped between the sleeve member and the cap member. A further object is to form the line space between outwardly-extending flanges of such cap members and preferably to extend these flanges into the zone containing the friction members.

The weight of a plumb bob is substantially reduced by forming a large reel chamber in the upper interior thereof, and further reduced if its elements are die cast from materials other than the usual brass, as is desirable in the invention. It is an object of the invention to increase the weight in a selected portion of a plumb bob to increase its weight and lower the center of gravity of the plumb bob. In this connection it is an object to incorporate a liquid-containing cell in the plumb bob below the reel chamber. With larger plumb bobs it is an object of the invention to mold a cell space in the mating housing elements; also to provide for adjusting the weight of the plumb bob by changing cells or the amount of heavy liquid, such as mercury, therein.

Further objects and advantages of the invention will be evident to those skilled in the art from the following description of an exemplary embodiment.

Referring to the drawings:

FIG. 1 is a vertical mid-sectional view of a plumb bob incorporating the invention;

FIG. 2 is a sectional view taken along the line 2—2 of FIG. 1;

FIG. 3 is an enlarged sectional view of a portion of FIG. 1 with some of the elements broken away;

FIG. 4 is a vertical sectional view taken along the line 4—4 of FIG. 3 showing some portions in elevation;

FIG. 5 is an elevational view of the sleeve member of the reel; and

FIG. 6 is an elevational view of the outer end of the spring.

The invention is desirably incorporated in a suitable housing, here exemplified as the housing 10 of a plumb bob made up of mated housing elements 11 and 11' indexed by pins 13 and held together by suitable means to be described. These housing elements are preferably die-molded in substantially identical dies. Various means can be employed to hold them together so that they mate or engage along a longitudinal plane. As illustrated, each housing element has a lower threaded portion 15 comprising a half-screw mating with a similar threaded portion on the other housing element to form a threaded protrusion. A tip 17 having a correspondingly threaded socket is screwed onto the protrusion and holds the lower ends of the housing elements together. In similar fashion the upper ends of the housing elements have threaded portions 18 onto which a cap 19 is screwed. The cap has a central opening 20 receiving a line 21.

The housing elements are molded to provide within the housing 10 a reel chamber 24 (FIG. 4), a line-receiving zone 25 (FIGS. 1 and 3) and a line-receiving opening 26 (FIGS. 1 and 4) that is aligned with the opening 20 of the cap 19. Specifically, each housing element 11, 11' is molded to provide a line socket 28 having a cylindrical wall 29 extending from the mating longitudinal plane to a radial wall 30. Outwardly of the line socket 28 is a friction-band socket 32 of smaller diameter providing a circumferential wall 33 and a radial wall 34. Outwardly thereof is a reel socket 36 of even smaller diameter providing a circumferential wall 37 and a radial wall 38.

The sockets 28, 32 and 36 are coaxial with a pivot axis A—A about which a reel 40 is journaled in any suitable manner. As shown, the reel 40 journals on a stationary central member 42 slotted in its central cylindrical portion to provide a diametrical slot 43 receiving and anchoring the inner end of a spring to be described. Outwardly of such cylindrical portion are square or otherwise non-circular ends 44 fitting into correspondingly shaped sockets 45 of the housing elements. Such a structure anchors the central member 42 from turning.

The opposed friction-band sockets 32 form circular channels receiving the edges of a friction band 50 having ends terminating near the line-receiving zone 25 (FIG. 3). In this respect it is desirable that the friction-band socket 32 and its circular channel should be peripherally discontinuous, providing shoulders 51 spaced from each other and preferably disposed on opposite sides of the line-receiving opening 26. The friction band 50 is usually a bent strip of sheet metal disposed in the opposed sockets 32 in engagement with the circumferential walls 33 thereof and with its ends abutting the shoulders 51 which act to hold the friction member 50 against turning in the housing 10. This mounting of the friction band 50 prevents any lateral or circumferential shifting thereof during use of the plumb bob. The friction band 50 bridges the line socket 28, forming therewith an open-ended line-receiving passage 53 bounded inwardly by a circular friction surface 54 (FIG. 4) provided by the outer surface of the friction band in that central zone thereof which spans the socket 28.

Spaced friction elements, exemplified as first and second pins 57 and 58, provide friction shoulders formed by exposed relatively-sharply-curved friction surfaces that are engaged and partially surrounded by the line 21. Paired sockets 59 (FIG. 4) are molded in the opposed housing elements to receive the ends of such pins. As shown in FIGS. 1 and 3, the line 21 bends sharply around the first pin 57 before entering the left or first end of the line-receiving passage 53. The line extends through this passage in frictional engagement with the circular friction surface 54 of the friction band 50 and from the right-hand or second end of this passage. The line then turns sharply about the second pin 58, preferably through an angle approaching 180°, before being wound on the reel 40 as will be described. It will be observed that the line loops about the second pin 58 without traversing the space between this pin and the corresponding right-hand end of the friction member. It will be observed also that both pins are spaced from the respective ends of the friction member. This is particularly important as concerns the spacing of the first pin 57 and the left-hand end of the friction member. The latter construction provides a space between such first pin and the corresponding end of the friction member through which the line flows into the left-hand end of the line-receiving passage 53 without danger of wear or entanglement.

The reel 40 includes a cylindrical sleeve member 60 providing a spring space 61 therewith around the central member 42. The sleeve member forms also the inner boundary of a line space 62 around the outer periphery thereof in which the line 21 is wound in turns.

The reel 40 includes also two identical cap members 66 respectively pressed on the ends of the sleeve member 60. Each cap member has a cylindrical portion 67 of an internal diameter substantially the same as the external diameter of the sleeve member so as to form a press fit with the exterior surface of one end of the sleeve member, this press fit being such as to retain the cap member in place by friction. The cylindrical portion is of an axial length less than half that of the sleeve member and provides at its inner end an outwardly extending flange 68 lying in a plane transverse to the pivot axis A—A. These flanges 68 of the two cap members extend into the friction-band socket 32 parallel to but spaced slightly from the radial walls 34 thereof. The outer circumferential edges of the flanges 68 preferably terminate short of the inner surface of the friction band 50. The flanges 68 determine the boundaries of the line space 62. One of these flanges provides two small holes 68a that are side by side near the inner portion of the line space 62. The inner end of the line 21 may be passed through these holes in sequence and its free end knotted or tied about a portion of the line. This anchors the inner end of the line to the reel.

Each cap member 66 also desirably provides a face flange 69 extending inward from the outer end of the sleeve member 60 and closing the spring space 61. Each face flange 69 provides also a journal opening 70 receiving the cylindrical portion of the central member 42 to journal the reel about the pivot axis A—A. The journalling portion of each flange may be thickened by a small external boss 71. The axial length of the reel 40 between the bosses 71 is slightly less than the axial distance between the radial walls 38 of the reel socket 36. This gives a minute amount of axial play and insures that there will be little or no friction between the boss and its corresponding radial wall 38.

A spiral spring 72 is disposed in the spring space 61 and has its inner and outer ends respectively connected to the central member 42 and to the reel 40. The inner end of the spring material is preferably bent inwardly from the innermost turn to extend into the diametrical slot 43 in anchoring relationship. The outer end of the spring is preferably cut to provide two spaced tabs 74 (FIG. 6). At corresponding locations the sleeve member 60 provides axially-aligned slots 75 (FIGS. 3–5) in zones respectively covered by the cylindrical portions 67 of the cap members 66. The tabs 74 are extended through the slots 75 and then bent circumferentially before the cap members are pressed in place. The result is that each tab 74 has a circumferential tip portion that is compressed tightly between the sleeve member 60 and the overlying cylindrical portion 67 of the corresponding cap member. This ideally anchors the outer end of the spring to the reel. It is usually preferable to employ two axially spaced tabs 74 but in some instances a single tab may be employed.

The spring 72 is of course wound to bias the reel 40 in a line-retrieving direction. In the orientation of FIG. 3 the spring will tend to turn the reel clockwise. In FIG. 3 the line 21 practically reverses its direction as it loops around the second pin 58, forming a tangential portion 78 approaching the right-hand side of the reel. If the angle of contact at the pin 58 is lessened, as by winding the line so that its tangential feed portion 78 is in the dotted line position of FIG. 3 and approaches the left-hand portion of the reel, the spring 72 should be reversed in position to bias the reel in a counterclockwise direction. With this latter arrangement it is usually desirable to employ a slightly heavier spring to develop a higher contact pressure between the line and the second pin 58.

With the arrangement of the elements herein shown and described it becomes possible to produce a retractable plumb bob which can be raised and lowered to any selected position, which position will then automatically be retained by the friction forces described. This is true whether the line is mostly on the reel, in which event the spring tension is relatively low, or if most of the line has been played out, in which event the spring tension is relatively higher. At the same time the friction forces are not such as to prevent the plumb bob from being pulled easily downward to lengthen the external portion of the line.

If desired the invention may provide means for increasing or adjusting the weight of the plumb bob. As shown, frusto-conical sockets are molded in the housing elements below the reel chamber. These form a frusto-conical cell cavity 80 in the assembled structure which can be filled or partially filled with material of higher density than the material of the housing elements. Preferably a liquid cell 82 is disposed in this cavity when the housing elements are assembled. This cell provides a container that conforms in shape to the cavity 80 and contains mercury or other heavy liquid 83 to a selected level, leaving an air space 84 thereabove. The top of the container may be closed by a cap 85 threaded or otherwise sealed to the container body in fluid-tight relation. By use of such a liquid cell it becomes possible to control the weight of a plumb bob irrespective of its dimensions and the material of which its housing elements are made.

Various changes and modifications can be made without departing from the spirit of the invention as defined in the appended claims.

I claim:

1. A line-retrieving plumb bob including in combination:

a housing made up of mated housing elements engaged in a longitudinal plane and cooperating with each other in providing a reel chamber having a pivot axis transverse to said longitudinal plane, said housing having a line-receiving opening communicating with said reel chamber through a line-receiving zone, each housing element providing a line socket opening on said longitudinal plane, a friction-band socket axially outward of and of smaller diameter than such line socket, and a reel socket of still smaller diameter axially outward of said friction-band socket, each of said sockets being concentric with said pivot axis, said friction-band socket providing circumferential and radial walls;

a friction band confined in said friction-band sockets forming with said line sockets an open-ended line-receiving passage around said friction band bounded inwardly by a circular friction surface provided by the outer surface of said friction band;

a reel having a line wound thereon, said reel having axially-spaced ends of smaller diameter than said reel sockets and extending therein, said reel having axially-spaced outwardly-extending flanges extending outwardly into said friction-band socket respectively adjacent and along said radial walls thereof, the space between said outwardly-extending flanges forming a line space, said reel providing a spring space radially inward of said line space; and a spiral spring in said spring space having its inner end anchored to said housing and its outer end connected to said reel, said spring biasing said reel to turn about said axis in a line-retrieving direction, said line extending from said line-receiving opening along said line-receiving passage from end to end thereof in frictional engagement with said circular friction surface and thence into said line space of said reel.

2. A line-retrieving plumb bob as defined in claim 1 including a stationary central member in said reel chamber coaxial with said pivot axis, and means for journaling said reel on said central member, said last-named means including inwardly-extending face flanges on said reel closing said spring space and having journaling openings receiving said central member, said inner end of said spring being anchored to said central member, said outwardly-extending flanges extending toward said friction band and terminating in circumferential edges spaced slightly from said friction band.

3. A line-retrieving plumb bob as defined in claim 1 in which said reel includes a cylindrical sleeve member separating said line space and said spring space, and two cap members pressed on the ends of said sleeve member, each cap member having a cylindrical portion of external diameter less than the diameter of said reel sockets and an internal diameter forming a press fit with the exterior surface of the corresponding end of said sleeve member, said cylindrical portion being of an axial length less than half that of said sleeve member, one of said outwardly-extending flanges being integral with the inner end of said cylindrical portion, each of said cap members including an inwardly extending face flange integral with the outer end of said cylindrical portion and closing one side of said spring space, said sleeve member having two axially-aligned slots therethrough near the ends thereof in zones respectively covered by the cylindrical portion of the corresponding cap member, the outer end of said spring being a bifurcated end having two axially-spaced tabs extending respectively through said slots, each tab having a circumferential tip compressed between said sleeve member and the overlying cylindrical portion of the corresponding cap member.

4. In combination with a line-retrieving plumb bob having a housing and a reel chamber therein traversed by a stationary central member concentric with a pivot axis, a reel-spring unit turning about said central member and said pivot axis to retrieve and play out a line entering said reel chamber and extending from said housing, said reel-spring unit including:

a cylindrical sleeve member concentric with said pivot axis providing a spring space therewithin around said central member;

a spiral spring in said spring space having its outer and inner ends respectively connected to said sleeve member and said central member; and a cap member pressed on each end of said sleeve member, each cap member having a cylindrical portion of an internal diameter forming a press fit with the exterior surface of one end of said sleeve member, said cylindrical portion being of an axial length less than half that of said sleeve member and having an inner end disposed inwardly of the corresponding end of said sleeve member, each cap member having an outwardly-extending flange at its inner end lying in a plane transverse to said pivot axis, at least one of said cap members having an inwardly-extending face flange closing said spring space and providing a journalling opening receiving said central member, the outwardly-extending flanges forming with the intervening outer surface of said sleeve member a line space in which said line is wound, said sleeve member having an axial slot therethrough at one end thereof in a zone covered by the cylindrical portion of the corresponding cap member, the outer end of said spring having a tab extending through said slot, said tab having a circumferential tip portion compressed between said sleeve member and the overlying cylindrical portion of such cap member.

References Cited by the Examiner

UNITED STATES PATENTS

| 1,349,565 | 8/1920 | Ewing | 33—217 |
| 2,230,668 | 2/1941 | Ohrtmann | 33—138 |
| 2,420,096 | 5/1947 | Roose | 33—217 |
| 3,064,356 | 11/1962 | Kruse | 33—217 |

LEONARD FORMAN, *Primary Examiner.*

L. ANDERSON, *Assistant Examiner.*